United States Patent
Robbins et al.

(10) Patent No.: US 10,425,774 B2
(45) Date of Patent: Sep. 24, 2019

(54) GROUP COMMUNICATION DEVICE MANAGEMENT

(71) Applicant: Orion Labs, San Francisco, CA (US)

(72) Inventors: Jesse Robbins, San Francisco, CA (US); Greg Albrecht, San Francisco, CA (US); Roger Wood, San Francisco, CA (US); Neil Girling, Oakland, CA (US); Ellen Juhlin, San Franciso, CA (US)

(73) Assignee: Orion Labs, San Francisco, CA (US)

( * ) Notice: Subject to any disclaimer, the term of this patent is extended or adjusted under 35 U.S.C. 154(b) by 41 days.

(21) Appl. No.: 15/521,657

(22) PCT Filed: Oct. 30, 2015

(86) PCT No.: PCT/US2015/058225
§ 371 (c)(1),
(2) Date: Apr. 25, 2017

(87) PCT Pub. No.: WO2016/069991
PCT Pub. Date: May 6, 2016

(65) Prior Publication Data
US 2017/0251343 A1 Aug. 31, 2017

Related U.S. Application Data

(60) Provisional application No. 62/073,352, filed on Oct. 31, 2014.

(51) Int. Cl.
*H04W 4/08* (2009.01)
*H04W 4/50* (2018.01)
(Continued)

(52) U.S. Cl.
CPC ............... *H04W 4/08* (2013.01); *H04L 67/02* (2013.01); *H04W 4/02* (2013.01); *H04W 4/10* (2013.01); *H04W 4/50* (2018.02); *H04W 4/80* (2018.02)

(58) Field of Classification Search
CPC .......... H04W 4/10; H04W 4/08; H04W 4/02; H04W 4/001; H04W 4/008; H04W 4/50; H04W 4/80; H04L 67/02
See application file for complete search history.

(56) References Cited

U.S. PATENT DOCUMENTS

2005/0149951 A1* 7/2005 Uola ........................ G06F 8/60
719/328
2005/0267936 A1 12/2005 Poikselka
(Continued)

*Primary Examiner* — Devan A Sandiford

(57) ABSTRACT

Provided herein are systems, methods, and software to manage group communications using distributed end user devices. In one example, a method of operating a communication device to facilitate secure group communications in a distributed communication environment is provided. The method includes establishing a communication channel (140) with an end user device (110), retrieving registration information from the end user device (110) over the communication channel (140), and generating a device configuration request including the registration information. The method further includes sending the device configuration request for delivery to a group management system (130) over a packet-based network (141), and responsive to receiving a particular device configuration, automatically configuring a group communications application executing on the communication device based on one or more parameters contained in the particular device configuration. The particular device configuration is selected by the group management system based on the registration information.

17 Claims, 8 Drawing Sheets

(51) Int. Cl.
    *H04W 4/10*     (2009.01)
    *H04W 4/02*     (2018.01)
    *H04L 29/08*    (2006.01)
    *H04W 4/80*     (2018.01)

(56) References Cited

U.S. PATENT DOCUMENTS

| | | |
|---|---|---|
| 2006/0276213 A1 | 12/2006 | Gottschalk et al. |
| 2009/0171659 A1 | 7/2009 | Pearce et al. |
| 2009/0181653 A1* | 7/2009 | Alharayeri .............. H04W 4/02 455/414.1 |
| 2013/0231049 A1* | 9/2013 | Sharma ................ G06F 1/1632 455/41.2 |
| 2013/0231100 A1* | 9/2013 | Sharma ................... H04W 4/10 455/418 |
| 2015/0141005 A1* | 5/2015 | Suryavanshi ......... H04L 67/125 455/434 |
| 2017/0180954 A1* | 6/2017 | McHugh ................. H04W 4/08 |
| 2017/0280304 A1* | 9/2017 | Okada ................... H04W 76/14 |

\* cited by examiner

GROUP COMMUNICATION DEVICE MANAGEMENT

CROSS-REFERENCE TO RELATED APPLICATIONS

This application hereby claims the benefit of priority to U.S. Provisional Patent Application Ser. No. 62/073,352 titled "GROUP COMMUNICATION DEVICE MANAGEMENT" filed on Oct. 31, 2014, which is expressly incorporated by reference herein.

TECHNICAL FIELD

Aspects of the disclosure are related to group communication and, in particular, to end user devices and applications for efficient group communication.

TECHNICAL BACKGROUND

Telephones, computers, and tablets provide an efficient way for users to communicate without being in the same physical location. However, these devices often require the user to provide multiple inputs and preferences for each of the communications before the communications can take place. Such preferences may include the individuals involved in the communication, a contact identifier for the individuals in the communication, amongst a variety of other preferences. Moreover, when busy performing other tasks, it is often obtrusive to hold a telephone, computer, or tablet to make the communication, and takes focus away from the current task.

Overall, the examples herein of some prior or related systems and their associated limitations are intended to be illustrative and not exclusive. Upon reading the following, other limitations of existing or prior systems will become apparent to those of skill in the art.

OVERVIEW

Provided herein are systems, methods, and software to manage group communications. In one example, a group management system configured to facilitate secure communications between multiple nodes in a distributed communication environment is provided. The group management system includes one or more processors and a computer readable storage medium. The computer readable storage medium has instructions stored thereon that, when executed by the one or more processors, cause the group management system to process a communication message transmitted by a first node to determine an identity of the first node and identify a listing of one or more active communication groups to which the first node is affiliated. The instructions further cause the system to identify recipient nodes that are affiliated with the one or more active groups based on active group information, and direct the system to relay the communication message to the active recipient nodes.

In another example, a computer readable storage medium having a group communications application stored thereon is provided. The group communications application includes instructions that, when executed by one or more processors of a communication device, cause the communication device to establish a communication channel with an end user device and retrieve registration information from the end user device over the communication channel. The instructions further cause the communication device to generate a device configuration request including the registration information, send the device configuration request for delivery to a group management system over a packet-based network, and responsive to receiving a particular device configuration, automatically configure a group communications application based on one or more parameters contained in the particular device configuration. The particular device configuration is selected by the group management system based on the registration information.

In another example, a method of operating a communication device to facilitate secure group communications in a distributed communication environment is provided. The method includes establishing a communication channel with an end user device, retrieving registration information from the end user device over the communication channel, and generating a device configuration request including the registration information. The method further includes sending the device configuration request for delivery to a group management system over a packet-based network, and responsive to receiving a particular device configuration, automatically configuring a group communications application executing on the communication device based on one or more parameters contained in the particular device configuration. The particular device configuration is selected by the group management system based on the registration information. The method further includes relaying communications received from the end user device for delivery to one or more other communication devices responsive to configuration of the group communications application based on the particular device configuration.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
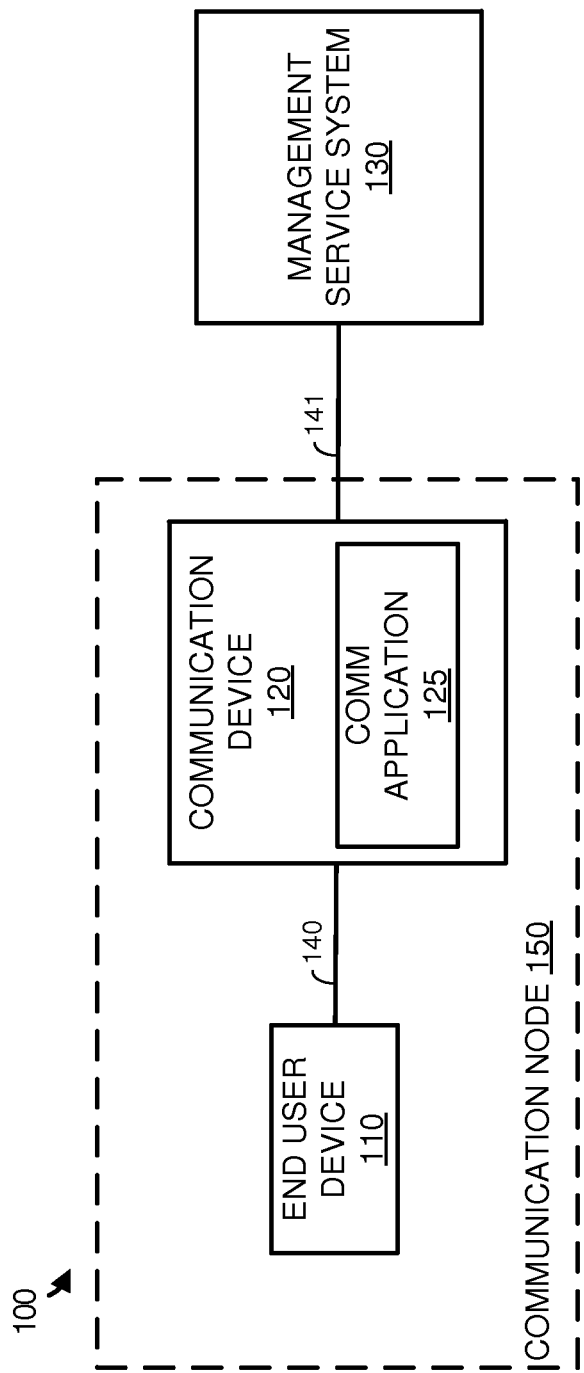
FIG. 1 illustrates an example system configured to facilitate secure communications.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

FIG. 1 illustrates an example system 100 configured to facilitate secure communications. More specifically, FIG. 1 illustrates an example depicting registration of an end user device with a communication device and a management service system. System 100 includes a communication node including end user device 110 and communication device 120, and management service system 130. Communication device 120 communicates with end user device 110 over communication link 140, and further communicates with management service system 130 over communication link 141.

Communication device 120 may comprise a smartphone, tablet, computer, or some other communication device capable of communicating with management service system 130 using the Internet or some other global communication network. Management service system 130 may comprise a server system comprising one or more computing devices capable of providing communication services to a plurality of end user devices, such as end user device 110. End user device 110 may comprise a speaker, microphone, processing system, communication interface, and a user interface to provide communications over communication device 120 to management service system 130 and other end user devices.

In operation, end user device 110 is initiated to allow an end user to communicate with other groups of persons without providing user input to communication device 120. Once end user device 120 is initiated, communication application 125 installed on communication device 120 identifies end user device 120 and gathers authentication information that correspond to end user device 110 and/or the user of the end user device (not shown). This authentication information may include an identifier for end user device 110, an identifier for the user of end user device 110, or other similar identification information. Further, in some instances, the user of end user device 110 and communication device 120 may alternatively or additionally provide identifier information, e.g., a username, an authentication token, e.g., a password, a position within an organization, or some other information.

Once communicatively coupled to communication device 120, communication device 120 may configure the communication application 125 including the groups to which the user is allowed to communicate (e.g., affiliated groups). In response to identifying the groups, communications may be initiated for end user device 110 over communication device 120 to management service system 130 and other end user devices.

Referring to communication links 140-141, communication link 140 may comprise a Bluetooth communication link, a WiFi link, or any other similar short distance communication link between end user device 110 and communication device 120. For example, end user device 110 may comprise a wearable device that allows a user to touch the device to communicate using communication application 125. Thus, rather than using communication device 120 for each of the communications with the groups identified in communication application 125, the user may touch end user device 110 and communicate via the near range communication link. Communication link 141, however, connects communication device 120 to management service system 130 using Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication links 140-141 each use metal, glass, optical, air, space, or some other material as the transport media. Communication links 140-141 may each be a direct link, or can include intermediate networks, systems, or devices, and can include a logical network link transported over multiple physical links.

Figure 2:
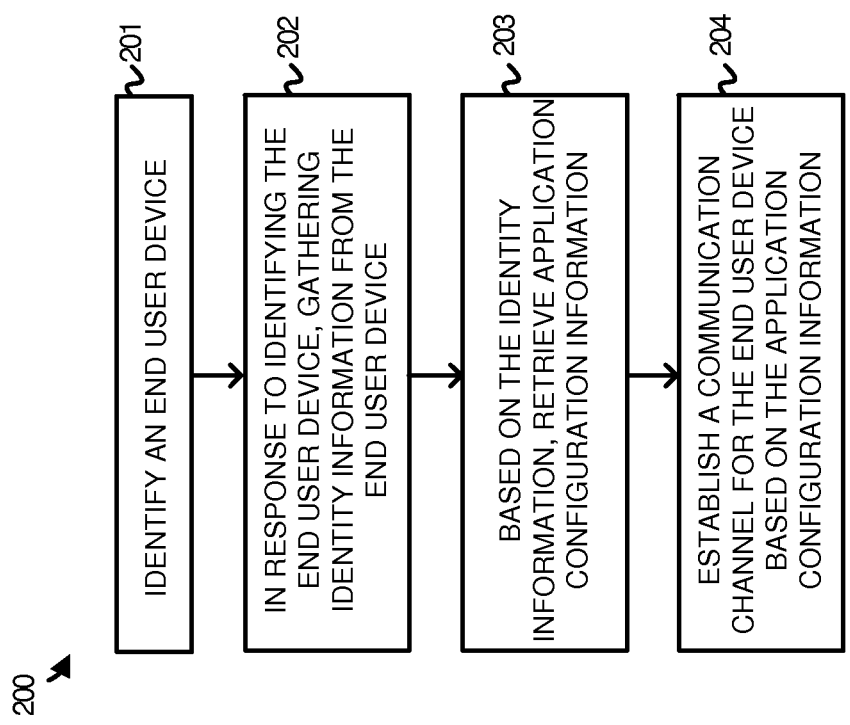
FIG. 2 illustrates a method of operating a communication device to register an end user device with a management service system.

Turning to FIG. 2, FIG. 2 illustrates a method of operating a communication device to register an end user device with a management service system. As described in FIG. 1, a communication device may comprise a smartphone, a computer, a tablet, or any other computing device configured to communicate with a management service system. Rather than using the communication device to communicate with specific groups desired by the user or an organization, in some embodiments, an end user device may be used in conjunction with an application on the communication device to provide the desired communications.

To accomplish this task, the communication device may identify an end user device that is associated with the communication application on the communication device (201). Responsive to identifying the end user device, the communication device may gather identity information from the end user device (202). This information may include an identifier of the device itself, as well as information about the user of the device. Once the identity information is determined, the communication device may retrieve application configuration information for the end user device (203). In some examples, this information may be determined from the end user device itself. However, in other instances, information may be gathered from the management service system. Thus, as illustrated in FIG. 1, communication application 125 may query management service system 130 to gather application configuration information for the end user device. This information may include the groups for which the user is assigned to communicate, the overarching organization that the user belongs to, or any other configuration information to define persons to which the user is allowed to communicate. Once the configuration is implemented for the end user device, the communication device may initiate a communication for the end user device based on the configuration information (204).

For example, if the user initiates a communication on the end user device, the communication device may forward the communication to the management service system to distribute the communication to the appropriate groups. Similarly, the application may receive and forward communications to the end user device based on the configuration.

Figure 3:
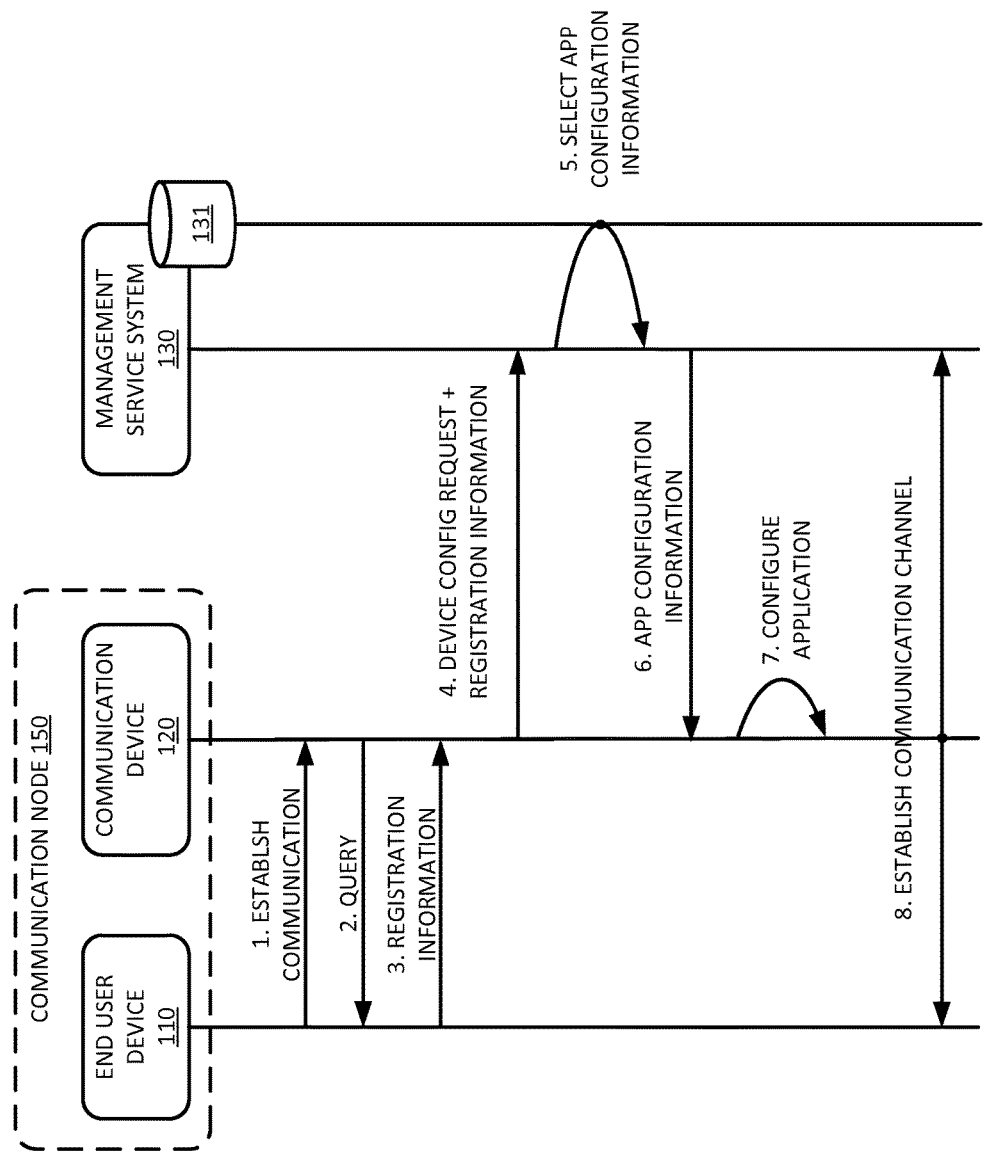
FIG. 3 illustrates a sequence diagram depicting the group communication system 100 registering end user device with a management service system.

To further explain the registration operation, FIG. 3 illustrates a sequence diagram depicting the group communication system 100 registering end user device 110 with a management service system 130. The management service system 130 can include one or more data stores 131 configured to store, among other items, group configuration information and application configuration information. In some embodiments, the storage units can be functionally and/or physically distributed.

To begin, at step 1, communication is established between the end user device 110 and the communication device 120. For example, when communication application 125 is launched or otherwise executed on the communication device 120, the communication application 125 may automatically detect whether the communication device is paired with the end user device 110. If not, the communication application 125 can facilitate and/or otherwise guide the user through the pairing process. In some embodiments, the end user device 110 is unique to the communication application 125 in that the end user device 110 will not operate with other applications executing or running on communication device 120. As discussed above, in one example of operation the communication link 140 may comprise a Bluetooth communication link. In such cases, the user may be directed to perform the platform-required pairing procedure.

Once the devices are paired, the communication channel is established. In some embodiments, the communication application 125 can direct the communication device 120 and/or the end user device 110 to provide an audio or visual confirmation that the pairing was successful. At step 2, the communication application 125 generates and a query and directs the communication device 110 to transmit the query to the end user device 110. As discussed herein, at step 3, the end user device 110 responds to the query with registration information. As discussed herein, the registration information can include identity information, security information, group configuration settings, etc.

The communication device, at step 4, sends an application registration request that includes the registration information to the management service system 130. In some embodiments, the management service system 130 receives the registration request and/or the registration information via one or more Application Program Interface (API) servers. Once received, at step 5, the management service system 130 generates application configuration information based on the registration information from the data store 131. At step 6, the management service system 130 sends the specific application configuration information to the communication device 120 which, at step 7, uses the specific application configuration information to configure the communication application 125. In this manner, the communication application 125 can be automatically configured based on the registration information and/or other information provided to the management service system 130.

Once configured, a secure communication channel is established between the communication node 150 and the management server system 130. As described herein, the secure communication channel can include communications to one or more groups to which the communication node 150 is affiliated. As described in more detail with reference to FIGS. 5 and 6, the communications can be initiated by the communication device 120 or by the end user device 110 and transmitted to the management service system 130 by way of the communication device.

Figure 4:
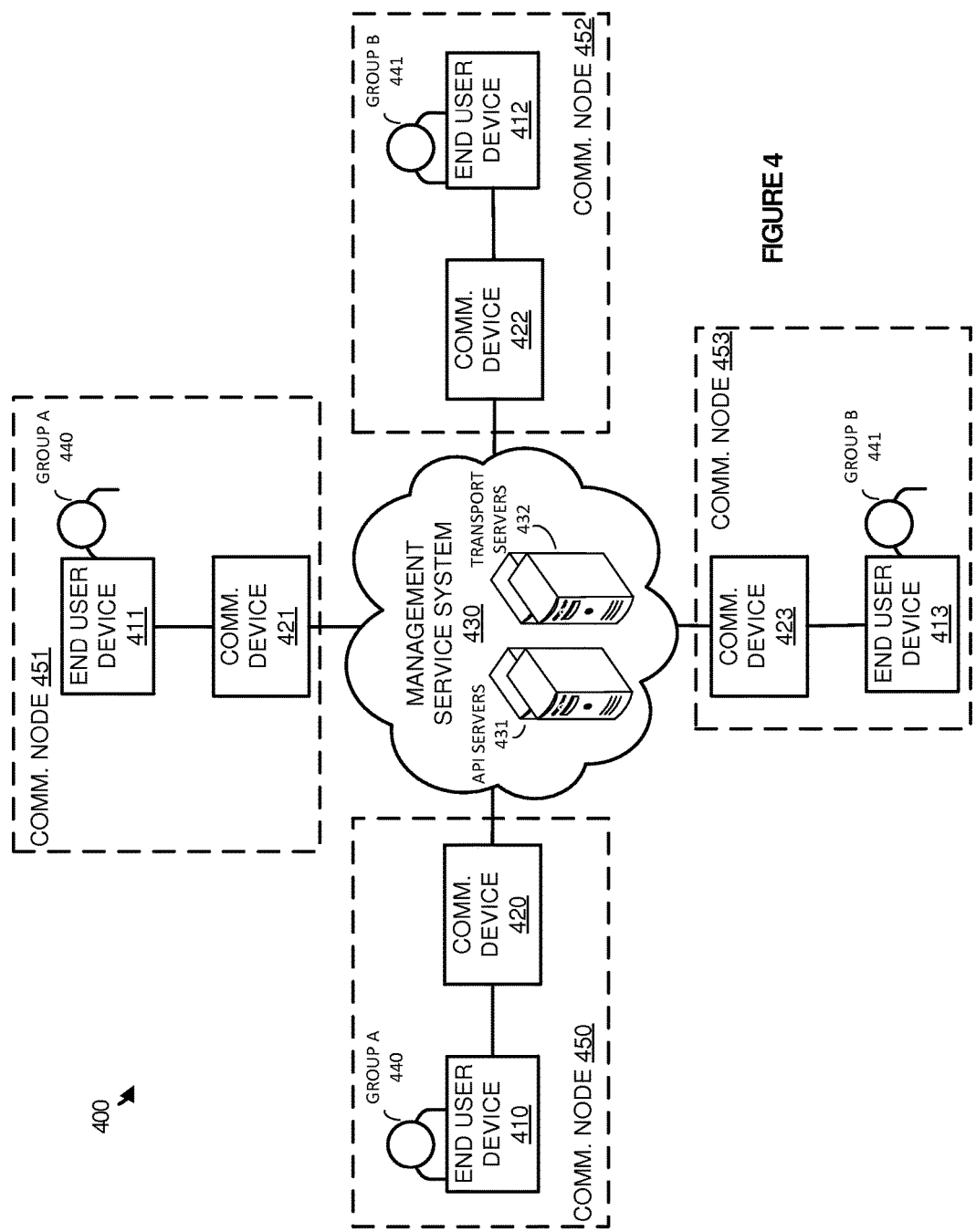
FIG. 4 illustrates a distributed communication environment in which communication nodes communicate with other communication nodes in the same group via a management service system.

To further illustrate the operation of the group communication system, FIG. 4 illustrates a distributed communication environment 400 in which communication nodes communicate with other communication nodes in the same group via a management service system. The distributed communication environment 400 includes communication nodes 450-453 and management service system 430. The communication nodes 450-453 include end user devices 410-413 and communication device 420-423, respectively. As shown in the example of FIG. 4, the management service system 430 includes API servers 431 and transport servers 432.

Although not shown, the end user devices 410-413 are communicatively coupled to group communication applications executing on communication devices 420-423, respectively. The end user devices 410-413 provide registration information that allows users of the devices or communication nodes to communicate based on, for example, preconfigured settings for a particular organization (or group) to which the users belong. As discussed in the example of FIG. 3, the preconfigured settings can be received and enforced by group communication applications executing on the communication devices 420-423.

Once the group communication applications executing on the communication devices 420-423 are configured, communications can be routed through the management service system 430 to each of the other devices (communication and/or end user devices) in the group. As illustrated in the example of FIG. 4, two end user devices 410-411 are associated with group A 440, whereas end user devices 412-413 are associated with group B 441. As a result of this configuration, end user devices 410-411 only communicate with each other, and end user devices 412-413 may only communicate with each other.

Although the devices are illustrated as affiliated with a single group, it should be understood that each of the devices might belong to or be affiliated with multiple groups. For example, a supervisor may require communications with safety personnel group, a site team group, or any other group within an organization. However, the safety personnel may only require communications with other safety personnel and the supervisors. Thus, different groups within an organization may be configured to allow users quick communications with the necessary contacts.

In some embodiments, the API servers 431 can include a REST API exposed over HTTPS that provides the back-end functionality for user-visible actions and events. The API can include various functionality for user actions such as, for example, search for contacts or groups, create new groups, read current list of members and other group data, unsubscribe from a group, read current list of the user's contacts, add or remove contacts, create new users, and user login/logout. In some embodiments, the API uses JSON as the medium of exchange. The API servers 431 can handle the event streams which represent group/channel events that are happening in "real-time." The events (also referred to as attributes) can include, but not limited to: PTT events, changes to group membership, geolocation updates, and changes to user statuses. In some embodiments, the event stream provides newline-delimited JSON objects to listening clients.

In some embodiments, the transport servers 432 include Hypter Text Transfer Protocol (HTTP) PUT- and GET-based stream transfer servers for PTT events. The transport servers 432 can provide temporary storage for all media streams, allowing connection loss recovery. The transport servers 432 can also allow a sending client to upload streams, and multiple receiving clients (or CDN proxy servers) to download streams. Additionally, the HTTP servers facilitate asynchronous transmitting and receiving. In some embodiments, the transport server can also monitor overall system performance (e.g., latency) and provide various metrics.

Figure 5:
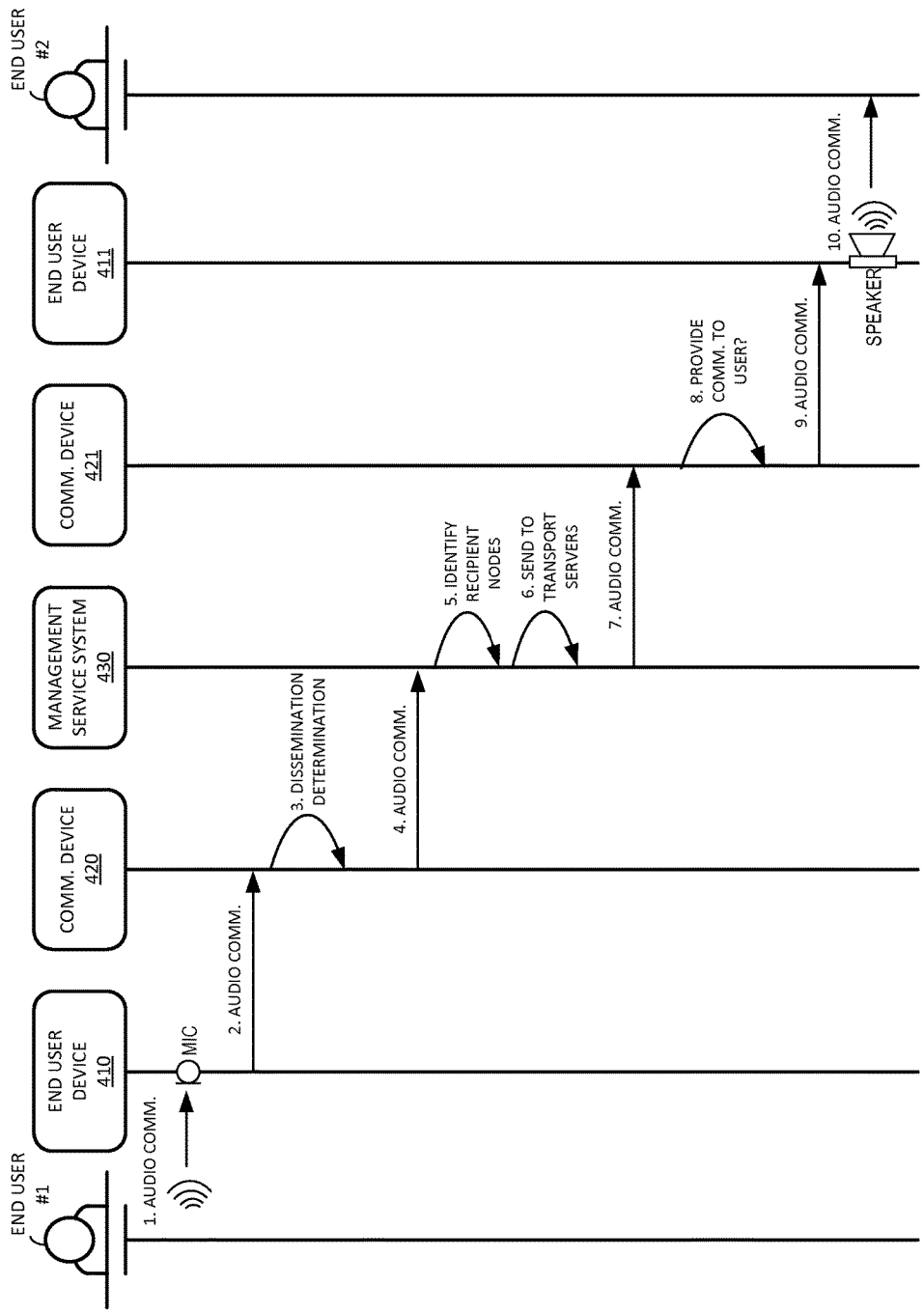
FIG. 5 illustrates a sequence diagram depicting example communication between multiple communication nodes that are affiliated with the same group.

FIG. 5 illustrates a sequence diagram depicting example communication between multiple communication nodes that are affiliated with the same group. Specifically, the example of FIG. 5 depicts an example push-to-talk (PTT) communication between communication nodes 450 and 451 in distributed communication environment 400 of FIG. 4. As discussed above, communication nodes 450 and 451 include end user devices 410 and 411 and communication devices 420 and 421, respectively. Furthermore, while a PTT communication is described, it is appreciated that other communications between group members are possible.

To begin, a secure communication channel is established between the communication nodes 450 and 451 and the management server system 430 as discussed above with respect to FIG. 3. At step 1, the end user #1 speaks and the audio is captured by a microphone in end user device 410. The captured audio is transmitted to the communication device 420 at step 2. At step 2, the communication device 420 and, more particularly, the group communication application executing on the communication device 420, may make a determination as to whether the communication should be disseminated to other communication nodes in group A. The determination can be based on any number of factors which can be included in the application configuration information. For example, the factors can be different from group-to-group, determined based on the type of end user device, the location of the end user device relative to other end user devices in the group, etc.

In the example of FIG. 5, a determination is made to disseminate the audio communication and thus, at step 4, the audio communication is transmitted to the management service system 430. At step 5, the management service system determines an identity of the communication node 450 (e.g., communication device 420 and/or end user device 410) and identifies a listing of active communication groups to which the communication node 450 is affiliated. The listing includes one or more active communication groups. As discussed herein, the active communication groups including one or more group members with an 'active' status. The management service system also identifies recipient nodes that are affiliated with the one or more active groups based on active group information.

At step 6, the management server system sends the audio message the transport servers 432 and directs the one or more transport servers 432 to transmit, send or otherwise relay the audio message to the active recipient nodes. As illustrated in the example of FIG. 5, communication node 451 is the only active node in group A.

Accordingly, at step 7, the transport servers 432 send the audio message to communication device 421 of node 151. The communication device 421 may make a determination as to whether the audio communication should be sent to the end user device 411. The determination can be based on any number of factors which can be included in the application configuration information. For example, the end user device might be muted or the user may have configured the communication application executing on the communication device 421 to suspend or ignore particular messages or individuals. Other factors are also possible. In the example of FIG. 5, the communication device 421 relays the audio message to the end user device 411 at step 9 and, at step 10, the end user device 411 presents the audio communication to end user #2 via, for example, a speaker.

Figure 6:
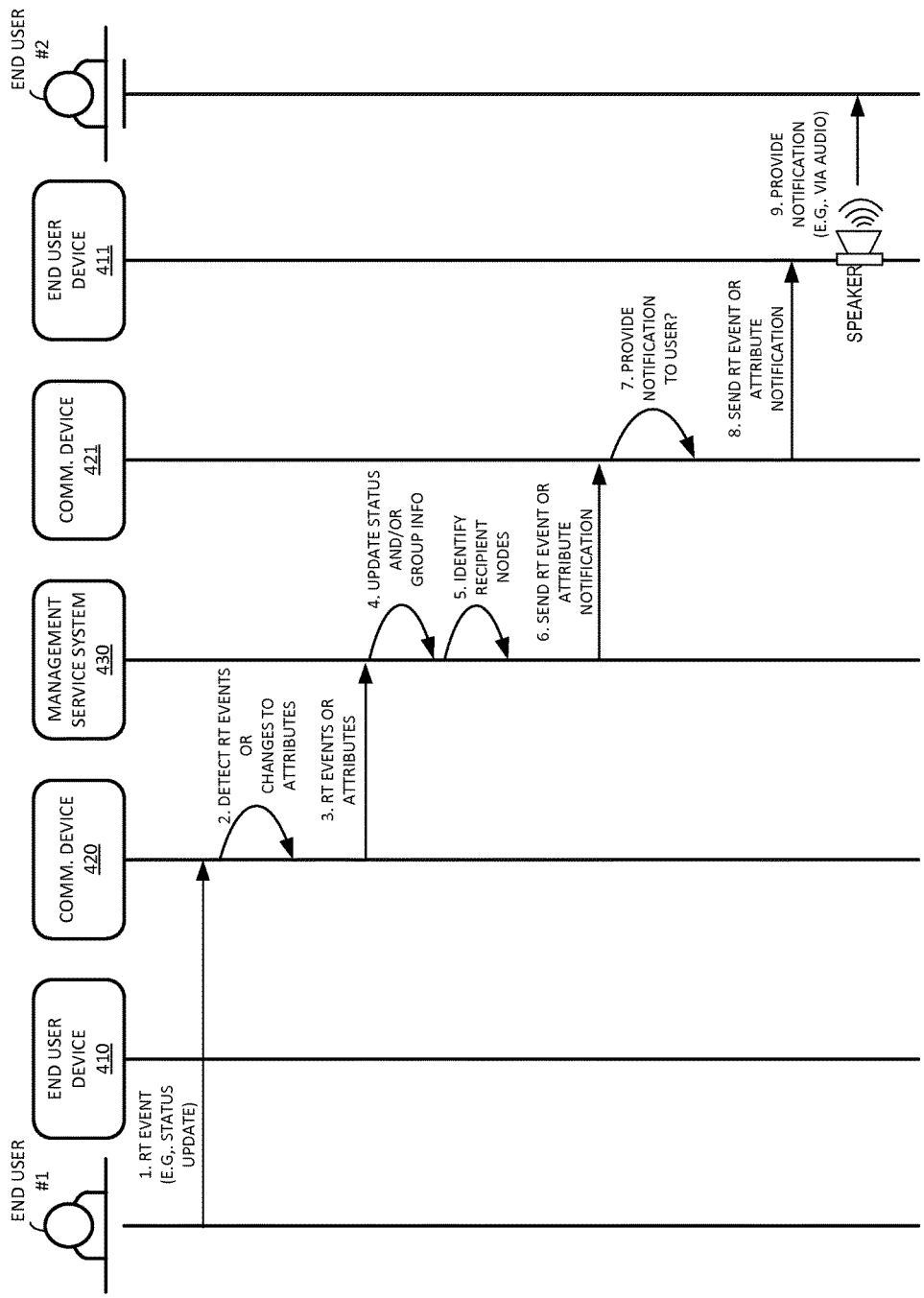
FIG. 6 illustrates a sequence diagram depicting example communication between multiple communication nodes that are affiliated with the same group.

FIG. 6 illustrates a sequence diagram depicting example communication between multiple communication nodes that are affiliated with the same group. The example of FIG. 6 is similar to the example of FIG. 5, however, instead of an audio or PTT communication, the example of FIG. 6 depicts a real-time event.

As discussed herein, a real-time event can include a user action including changes to user status (e.g., active, inactive, mute, etc.), changes to group information, etc. Although the real-time event of FIG. 6 is initiated by end user #1, in other examples, real-time events or attributes can be monitored by the communication device. For example, the communication device can monitor GPS location information and send this information to the management service system for aggregation distribution of the data to group members. In some embodiments, location information of group members is provided to each of the other group members by way of a map view that is presented to the users by way the communication application on the communication device. An example graphical user interface illustrating the map view is shown and discussed in greater detail with reference to FIG. 7.

As discussed with respect to FIG. 5, prior to distribution of a communication, a secure communication channel is established between the communication nodes 450 and 451 and the management server system 430 as discussed above with respect to FIG. 3. At step 1, end user #1 initiates a real-time (RT) event such as, for example, a change in status from 'active' to 'inactive'. As shown in the example of FIG. 6, the status update is made by way of the communication device 420, e.g., via a touch screen display presented on the communication device at the direction of the communication application, however, real-time updates or changes to attributes can be also be automatically detected by the communication device or made by the user via the end user device.

Figure 8:
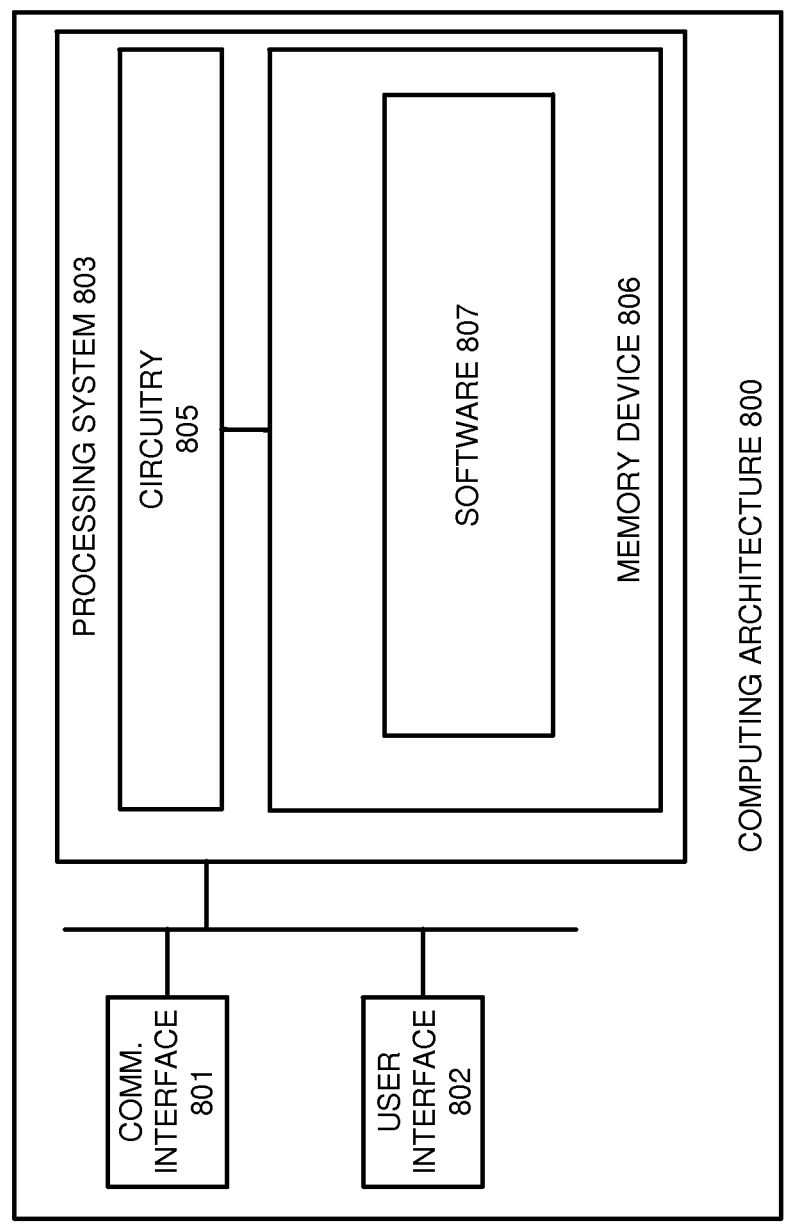
FIG. 8 illustrates a computing architecture to provide group communications via end user devices.

At step 2, the communication device 420 detects the RT event or changes to attributes and, at step 3, sends the updates to the management service system 430. The management service system 430, at step 4, updates changes to status or group information. For example if a user status changes from 'active' to 'inactive', the user will be removed from the active group. At step 5, the management service system 430 identifies recipient nodes that should be made aware of the updates statuses and/or group information (e.g., other active group members). In the example of FIG. 6, communication node 451 is the only other active node in group A. Accordingly, at step 6, the management service system 430 distributes a notification indicating the updates to communication device 421. Once received, communication device 421 may make a determination as to whether end user #2 should be made aware of the notification. The determination can be based on any number of factors which can be included in the application configuration information. For example, end user #2 may configure the end user device to beep when an active user leaves the group. Other examples are also possible. In the example of FIG. 8 the notification is send to the end user device 411 at step 8.

Lastly, the end user device 411 presents the audio communication to end user #2 via, for example, a speaker. It is appreciated that not all notifications, group updates, etc. will be presented to the end user #2 via the end user device 411.

Figure 7:
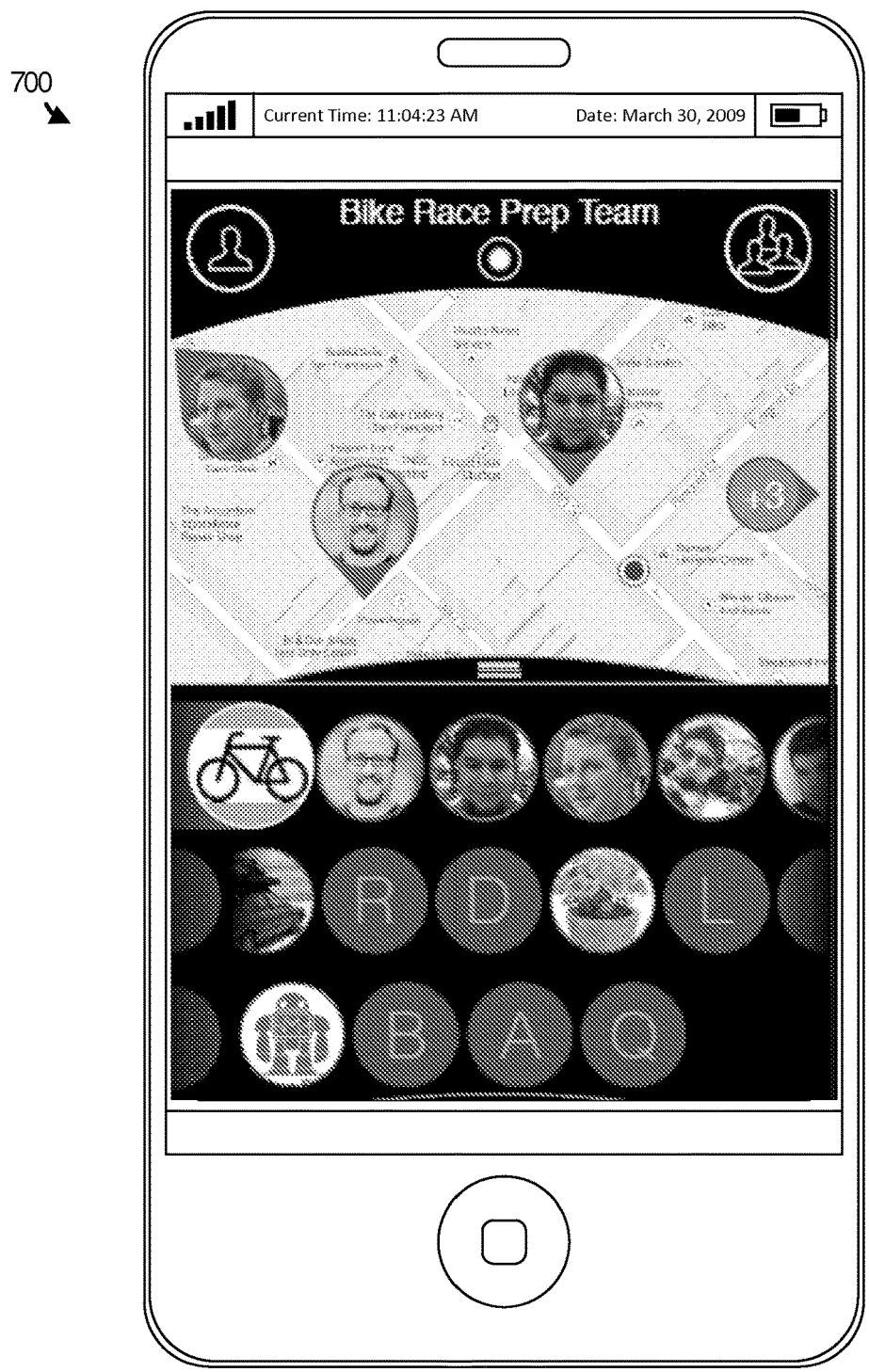
FIG. 7 illustrates an example graphical user interface that is presented to a user via a communication device.

FIG. 7 illustrates an example graphical user interface that is presented to a user via a communication device 700. More specifically, the example graphical user interface illustrates a map view which can be presented to a user by the communication application.

For example, when a user is active in a group, the main communication application screen can show or present a map along with the location of the other group members, and the location of the user. Using 'pinch to zoom' navigation, the user (or subscriber) can focus on a specific geography and see other members of groups to which the user belongs that are located in the area.

In some embodiments, if there are members in the group who are not visible in the map area displayed on the screen, they are indicated by a circle on the edge of the screen with an arrow pointing in the direction where they are located.

Although not shown, various other user interfaces can also be presented to users via the communication device 700. For example, users can add friends via the interfaces, search contact lists stored on their devices as well as address books available through Google, Microsoft Outlook, etc. In some embodiments, the communication application can also make group suggestions based on most frequently contacted people, common domain names, company names, etc. The communication application can also request access to the user's social networks, including Facebook, Google, Twitter and LinkedIn. Users can also manually enter contact information and, in some embodiments, amend groups (select, add, or remove), group status, application configuration, etc. via touch gestures. The various interfaces can also provide visual alerts and notifications.

Turning to FIG. 8, FIG. 8 illustrates a computing architecture 800 to implement the group communication systems described in FIGS. 1-7. Computing architecture 800 is representative of a computing architecture that may be employed as any computing apparatus, system, or device, or collections thereof, to suitably implement one or more of the systems or devices in FIGS. 1-7. Computing architecture 800 comprises communication interface 801, user interface 802, and processing system 803. Processing system 803 is communicatively linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 may include any number of software modules to provide the group communication operations described herein. Operating software 807 may further include an operating system, utilities, drivers, network interfaces, applications, or some other type of software. When executed by circuitry 805, operating software 807 directs processing system 803 to operate computing architecture 800 as described herein to provide group communications.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A non-transitory computer readable storage medium having a group communications application stored thereon, the group communications application including instructions, which when executed by one or more processors of a communication device, cause the communication device to:
   establish a communication channel with an end user device;
   retrieve registration information from the end user device over the communication channel;
   generate a device configuration request including the registration information;

send the device configuration request for delivery to a group management system over a packet-based network; and responsive to receiving a particular device configuration, automatically configure a group communications application based on one or more parameters contained in the particular device configuration, wherein the particular device configuration is selected by the group management system based on the registration information.

2. The non-transitory computer readable storage medium of claim 1, wherein the instructions, when executed by the one or more processors of the communication device, further cause the communication device to:

relay communications received from the end user device for delivery to one or more other communication devices.

3. The non-transitory computer readable storage medium of claim 1, wherein the instructions, when executed by the one or more processors of the communication device, further cause the communication device to detect real-time event and changes to attributes.

4. The non-transitory computer readable storage medium of claim 3, wherein the real-time events or attributes can include one or more of: push-to-talk (PTT) events, changes to group membership, geolocation information, or changes to user or node status information.

5. The non-transitory computer readable storage medium of claim 1, wherein the registration information can include one or more of identity information, security information, or group configuration settings.

6. The non-transitory computer readable storage medium of claim 1, wherein establishing the communications with the end user device comprises automatically facilitating pairing of the communications device with the end user device.

7. A method of operating a communication device to facilitate secure group communications in a distributed communication environment, the method comprising:

establishing a communication channel with an end user device;

retrieving registration information from the end user device over the communication channel;

generating a device configuration request including the registration information;

sending the device configuration request for delivery to a group management system over a packet-based network;

responsive to receiving a particular device configuration, automatically configuring a group communications application executing on the communication device based on one or more parameters contained in the particular device configuration, wherein the particular device configuration is selected by the group management system based on the registration information; and relaying communications received from the end user device for delivery to one or more other communication devices responsive to configuration of the group communications application based on the particular device configuration.

8. The method of claim 7, further comprising detecting real-time events and changes to attributes, wherein the real-time events or attributes can include one or more of: push-to-talk (PTT) events, changes to group membership, geolocation information, or changes to user or node status information.

9. The method of claim 7, wherein the registration information can include one or more of identity information, security information, or group configuration settings.

10. The method of claim 7, wherein establishing the communications with the end user device comprises automatically facilitating pairing of the communications device with the end user device.

11. A communication device comprising:
one or more processors;
a computer readable storage medium having instructions stored thereon that, when executed by the one or more processors, cause the one or more processors to:
establish a communication channel with an end user device;
retrieve registration information from the end user device over the communication channel;
generate a device configuration request including the registration information;
send the device configuration request for delivery to a group management system; and
responsive to receiving a device configuration, automatically configure a group communications application based on one or more parameters contained in the device configuration, wherein the device configuration is selected by the group management system based, at least in part, on the registration information.

12. The communication device of claim 11, wherein the instructions, when executed by the one or more processors, further cause the one or more processors to:
relay communications received from the end user device for delivery to one or more other communication devices.

13. The communication device of claim 11, wherein the instructions, when executed by the one or more processors of the communication device, further cause the one or more processors to detect real-time event and changes to attributes.

14. The communication device of claim 13, wherein the real-time events or attributes can include one or more of: push-to-talk (PTT) events, changes to group membership, geolocation information, or changes to user or node status information.

15. The communication device of claim 11, wherein the registration information can include one or more of identity information, security information, or group configuration settings.

16. The communication device of claim 11, wherein establishing the communications with the end user device comprises automatically facilitating pairing of the communications device with the end user device.

17. A non-transitory computer readable storage medium having a group communications application stored thereon, the group communications application including instructions, which when executed by one or more processors of a communication device, cause the communication device to:
establish a communication channel with an end user device;
retrieve registration information from the end user device over the communication channel, wherein the registration information includes at least one of a group for which the end user device is assigned to communicate, other end user devices for which the end user device is assigned to communicate, and an organization the end user device belongs to;
generate a device configuration request including the registration information;

send the device configuration request for delivery to a group management system over a packet-based network; and responsive to receiving a particular device configuration, automatically configure a group communications application based on one or more parameters contained in the particular device configuration, wherein the particular device configuration is selected by the group management system based on the registration information.

* * * * *